(12) United States Patent
Mitsui et al.

(10) Patent No.: US 6,308,992 B1
(45) Date of Patent: Oct. 30, 2001

(54) HOSE CONNECTING ASSEMBLY

(75) Inventors: Kenichi Mitsui, Ichinomiya; Naomi Nakashima, Iwakura; Norio Watanabe, Bisai; Koji Ito, Nagoya, all of (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/353,663

(22) Filed: Jul. 15, 1999

(30) Foreign Application Priority Data

Jul. 15, 1998 (JP) .................................................. 10-218623
Feb. 19, 1999 (JP) .................................................. 11-041436

(51) Int. Cl.$^7$ ...................................................... F16L 33/00
(52) U.S. Cl. ........................................ 285/239; 285/133.11
(58) Field of Search ................................. 285/133.11, 239

(56) References Cited

U.S. PATENT DOCUMENTS

| | | | | |
|---|---|---|---|---|
| 1,994,784 | * | 3/1935 | Prozel | .................................. 285/239 |
| 2,139,745 | * | 12/1938 | Goodall . | |
| 3,017,203 | * | 1/1962 | MaCleod . | |
| 3,966,238 | * | 6/1976 | Washkewicz | .......................... 285/239 |
| 4,603,890 | * | 8/1986 | Huppee . | |
| 4,997,213 | * | 3/1991 | Traner et al. . | |
| 5,335,944 | * | 8/1994 | Mitsui et al. | .......................... 285/239 |
| 5,853,202 | * | 12/1998 | Li et al. | .................................. 285/239 |

FOREIGN PATENT DOCUMENTS 9-159077   6/1997   (JP) .

* cited by examiner

*Primary Examiner*—Teri Pham Luu
(74) *Attorney, Agent, or Firm*—Pillsbury Winthrop LLP

(57) ABSTRACT

A hose connecting assembly of the present invention ensures a tight seal even when a hose 30 is bent and laid out in a narrow space and repeatedly is subject to vibrations under a low-temperature condition. The hose connecting assembly includes a connection tube 10, which is pressed into the hose 30. The hose 30 is designed to have an inner diameter change rate Dc of no greater than 23% under application of an inner pressure of about 0.49 MPa. Ring-shaped projections 21, 22, and 23 are formed on the outer circumferential surface of the connection tube 10. The ring-shaped projections 21, 22, and 23 are designed to make a diameter expansion rate T, which is defined by an inner diameter d1 of the hose 30 and an outer diameter D2 of the ring-shaped projections 21, 22, and 23, at least 25%. A hollow cylindrical end 18 is further formed on an end portion of the connection tube 10. It is preferable that the hollow cylindrical end 18 has a length of at least about 3 mm.

22 Claims, 16 Drawing Sheets

HOSE CONNECTING ASSEMBLY

BACKGROUND OF THE INVENTION

1. Field of the Invention

The present invention relates to a hose connecting assembly, where a hose connecting tube is pressed into a hose to ensure connection with the hose.

2. Description of the Related Art

There are known hose connecting assemblies, such as those disclosed in JAPANESE PATENT LAID-OPEN GAZETTE No. 9-159077. FIG. 26 is a partly broken front view illustrating a prior art hose connecting assembly including a branched pipe 100. Referring to FIG. 26, the hose connecting assembly includes the branched pipe 100 having three branched portions 101, 102, and 103, and hoses 111, 112, and 113, into which the branched portions 101, 102, and 103 are respectively pressed. A pair of ring-shaped projections 104 and 105 are formed around the circumferential face of each of the branched portions 101, 102, and 103. The ring-shaped projections 104 and 105 have a triangular cross section and are arranged at a certain interval. FIG. 27 is an enlarged cross sectional view illustrating the branched portion 101. As shown in FIG. 27, the ring-shaped projections 104 and 105 respectively have truncated cone faces 104a and 105a, which have outer diameters tapered toward the free end of the branched portion 101, and acute-angled faces 104b and 105b, which extend between outer edges of the truncated cone faces 104a and 105a and the base circumference of the branched portion 101, and which have an acute angle with the truncated cone faces 104a and 105a, respectively. The hose 111 includes an inner layer 111a made of an EPDM rubber, a thread-reinforced layer 111b made of braided or spirally networked reinforcing threads, and an outer layer 111c made of an EPDM rubber.

In the prior art hose connecting assembly, when the branched portion 101 is pressed into the hose 111, the ring-shaper projections 104 and 105 apply the force that expands the inner diameter of the hose 111. This force causes a large reaction force of the thread-reinforced layer 111b to limit the expansion. The hose 111 thus securely clamps the branched portion 101. Since the hose 111 is secured to the branched portion 101 with a large force, this arrangement ensures the secure connection of the hose 111 with the branched portion 101 without using any clamps and by simply pressing the branched portion 101 into the hose 111.

In the prior art hose connecting assembly, since the hose 111 is joined with the branched portion 101, without using any clamping fixtures such as clamps, and by simply pressing the branched portion 101 into the hose 111, a tight seal as well as the large securing force is required. The hose connecting assembly is required to ensure the tight seal even at places where the hose 111 is vibrated against the branched portion 101, for example, in an engine room of an automobile, and at places where a rotating force is applied to the hose 111.

SUMMARY OF THE INVENTION

The object of the present invention is thus to provide a hose connecting assembly that enables easy connection with a hose and ensures a tight seal even at a place exposed to vibrations.

At least part of the above and the other related objects is realized by a first hose connecting assembly, where a hose connecting tube is pressed into a hose to ensure connection with the hose. The hose connecting tube includes: a ring-shaped projection formed around an outer circumferential surface of the hose connecting tube to have an outer diameter D1, which is greater than an inner diameter d1 of the hose to which no pressure is applied; and a hollow cylindrical end formed between the ring-shaped projection and a free end of the hose connecting tube to be in close contact with an inner wall surface of the hose and have an outer diameter D2, which is smaller than the outer diameter D1. The hollow cylindrical end has a length of at least about 3 mm along an axis of the hose connecting tube.

In the first hose connecting assembly, the hose connecting tube has the ring-shaped projection, and the hose climbs over the ring-shaped projection when the hose connecting tube is pressed into the hose. The outer diameter D1 of the ring-shaped projection is set to be greater than the inner diameter di of the hose. When the hose connecting tube is inserted into the hose, the ring-shaped projection thus partly expands the inner wall surface of the hose. The hose is designed to have an inner diameter change rate Dc, which is defined by Equation (1) given below, less than or equal to 23% and cause a large reaction force against the diameter-expanding force, where d1 denotes an inner diameter of the hose when no pressure is applied and d2 denotes an inner diameter of the hose when an inner pressure of 0.49 MPa (5 kg/cm$^2$) is applied to the hose.

$$Dc=(d2-d1)\times 100/d1 \qquad (1)$$

The ring-shaped projection is designed to have a diameter expansion rate T, which is defined by Equation (2) given below, of at least 25%. The diameter expansion rate T here represents a rate of expansion of the hose having the inner diameter d1 to the outer diameter D1 of the ring-shaped projection.

$$T=(D1-d1)\times 100/d1 \qquad (2)$$

In the first hose connecting assembly, the hose has a large force to limit the expansion under application of a fluid pressure. When the hose climbs over the ring-shaped projection of the hose connecting tube and expands its diameter, the hose generates a large clamping force against the hose connecting tube as the reaction force. The hose having such a large clamping force does not readily come off the hose connecting tube and ensures a sufficiently tight seal. The hose is thus securely joined with the hose connecting tube without using any specific clamping mechanism, such as clips.

The hose connecting tube has a hollow cylindrical end formed between a free end of the hose connecting tube and the ring-shaped projection. The hollow cylindrical end is in close contact with the hose before the diameter of the hose is expanded by the ring-shaped projection. The hose is thus continuously in close contact with the hollow cylindrical end between the free end of the hose connecting tube and the ring-shaped projection, which expands the diameter of the hose. The hollow cylindrical end causes the hose to be in close contact with its smooth surface between the free end of the hose connecting tube and the ring-shaped projection even when the hose is exposed to vibrations. The hose accordingly keeps the tight seal against the hose connecting tube even under the low-temperature condition and the repeated application of vibrations to the hose.

It is preferable that the hollow cylindrical end has a length of 3 to 7 mm in the axial direction. A length of less than about 3 mm does not ensure a sufficient improvement in sealing property of the seal under the vibration-applying conditions. A length greater than about 7 mm, on the other hand, undesirably increases a frictional force when the hose connecting tube is inserted into the hose, and results in the poor insertion workability. It is accordingly preferable that the hollow cylindrical end has the length in the above range.

In order to make the inner diameter change rate Dc of the hose less than or equal to 23%, the hose may have a thread-reinforced layer embedded in a tubular layer of a rubber material. The thread-reinforced layer may be made of braided reinforcing threads, spirally wounded reinforcing threads, knitted reinforcing threads, or cloth.

It is preferable that at least an outer surface layer of the hose is made of an EPDM rubber. The EPDM rubber has an excellent resistance against ozone and does not crack even with long-term use in the diameter-expanding state.

The ring-shaped projection may have any shape that expands the diameter of the hose and enhances the seal. In accordance with one preferable embodiment, the ring-shaped projection has a truncated cone face and an acute-angled face. The truncated cone face has an outer diameter tapered toward a free end of the hose connecting tube. The acute-angled face extends from the maximum outer diameter of the truncated cone face to the base circumference of the hose connecting tube, and crosses the truncated cone face at an acute angle. The truncated cone face and the acute-angled face of the ring-shaped projection form a corner of an acute angle. When a pulling stress is applied to the hose, the acute-angled corner defined by the truncated cone face and the acute-angled face of the ring-shaped projection generates a large pull-out resistance.

The present invention is also directed to a second hose connecting assembly, where a hose connecting tube is pressed into a hose to ensure connection with the hose. The hose connecting tube includes a ring-shaped projection formed around an outer circumferential surface of the hose connecting tube to have an outer diameter, which is greater than an inner diameter of the hose. The hose connecting tube is pressed into the hose at a press fit factor Lh/Lp in a range of 1.05 to 1.4, where Lp denotes a length of the hose connecting tube and Lh denotes a length of the hose, into which the hose connecting tube is pressed.

In the second hose connecting assembly, the hose connecting tube has the ring-shaped projection, and the hose climbs over the ring-shaped projection when the hose connecting tube is pressed into the hose. Since the outer diameter of the ring-shaped projection is set to be greater than the inner diameter of the hose, the hose generates a large clamping force against the hose connecting tube as the reaction force. The hose having such a large clamping force does not readily come off the hose connecting tube and ensures a sufficiently tight seal. The hose is thus securely joined with the hose connecting tube without using any specific clamping mechanism, such as clips.

The hose is joined with the hose connecting tube over the length of the hose connecting tube. More specifically, the hose is secured to the hose connecting tube at the press fit factor Lh/Lp in the range of 1.05 to 1.4, where Lp denotes the length of the hose connecting tube and Lh denotes a length of the hose, into which the hose connecting tube is pressed. When the hose connection unit is pressed into the hose at the press fit factor Lh/Lp in the above range, the hose expanded by the ring-shaped projection has the high adhesion to the outer circumferential surface of the hose connecting tube and thereby ensures the tight seal.

The present invention is further directed to a third hose connecting assembly, where a hose connecting tube is pressed into a hose to ensure connection with the hose. The hose connecting tube includes a ring-shaped projection formed around an outer circumferential surface of the hose connecting tube to have an outer diameter, which is greater than an inner diameter of the hose. A ratio S1/S0 is set to be less than or equal to 0.95, where S0 denotes a cross sectional area of a gap Sp defined by an inner wall of the hose and the hose connecting tube at a press fit factor of 1, which is defined as Lh/Lp where Lp denotes a length of the hose connecting tube and Lh denotes a length of the hose, into which the hose connecting tube is pressed, and S1 denotes a cross sectional area of the gap Sp when the hose connecting tube is pressed into the hose.

In the third hose connecting assembly, since the ratio S1/S0 is less than or equal to 0.95, the hose may be expanded by the ring-shaped projection to have high adhesion to the outer circumferential surface of the hose connecting tube; thereby ensuring the tight seal.

In accordance with another arrangement applied to decrease the cross sectional area of the gap, the hose connecting tube includes a ring-shaped projection formed around an outer circumferential surface of the hose connecting tube to have an outer diameter, which is greater than an inner diameter of the hose. The ring-shaped projection has a curved face that smoothes a corner of the ring-shaped projection protruded from the outer circumferential surface of the hose connecting tube and is formed to come into contact with an inner wall surface of the hose, into which the hose connecting tube is pressed. This arrangement increases the adhesion of the hose to the hose connecting tube and enhances the seal at the corner of the ring-shaped projection.

The present invention is also directed to a fourth hose connecting assembly, where a hose connecting tube is pressed into a hose to ensure connection with the hose. The hose connecting tube includes: a ring-shaped projection formed around an outer circumferential surface of the hose connecting tube to have an outer diameter, which is greater than an inner diameter of the hose to which no pressure is applied; and a detent projection that is arranged close to the ring-shaped projection and has a different sectional shape from a sectional shape of the hose connecting tube to prevent the hose from being rotated relative to the hose connecting tube.

In the fourth hose connecting assembly, when the hose connecting tube is pressed into the hose, the detent projection is pressed against the inner wall of the hose and prevents the hose from rotating relative to the hose connecting tube. Even when a vibration or rotating force is applied to the hose, this arrangement effectively prevents the hose from rotating relative to the hose connecting tube and ensures the adhesion of the hose to the outer circumferential surface of the hose connecting tube, so as to maintain the high sealing property.

The present invention is further directed to a fifth hose connecting assembly, where a hose connecting tube is pressed into a hose to ensure connection with the hose. The hose connecting tube includes a ring-shaped projection formed around an outer circumferential surface of said hose connecting tube to have an outer diameter, which is greater than an inner diameter of said hose to which no pressure is applied. An adhesive is applied on at least one of the outer circumferential surface of said hose connecting tube and an inner circumferential surface of said hose, before said hose connecting tube is pressed into said hose, so that said hose connecting tube is fixed to said hose via the adhesive.

In the fifth hose connecting assembly, the adhesive, which has been applied prior to the insertion of the hose connecting tube into the hose, sets with an elapse of time, so as to ensure the secure joint of the hose connecting tube with the hose.

Even if the hose is exposed to a high temperature environment or a vibrating environment, for example, in an engine room and the fatigue of rubber of the hose lowers the pressing force of the hose against the hose connecting tube, the arrangement of utilizing the adhesive force of the adhesive ensures the tight seal. The adhesive layer applied on an inclined surface of the hose connecting tube is pressed especially strongly against the inner wall surface of the hose and thereby attains the high adhesion between the hose and the hose connecting tube. The adhesive force of the adhesive does not require the hose to have a thread-reinforced layer or to have a large diameter expansion rate.

Although the adhesive used here may be any adhesive that can bond the hose connecting tube to the hose, it is desirable to use a thermosetting adhesive that sets at temperatures in a working environment of the hose connecting assembly. This ensures the sufficient adhesion and enhances the reliability.

The adhesive may be applied alone or with an agent for insertion, if used, for facilitating the insertion of the hose connecting tube into the hose. The adhesive may be applied on any part of or over the whole of the inner wall surface of the hose or the outer circumferential surface of the hose connecting tube. The application area of the adhesive is not restricted as long as the sufficient adhesion is attained.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
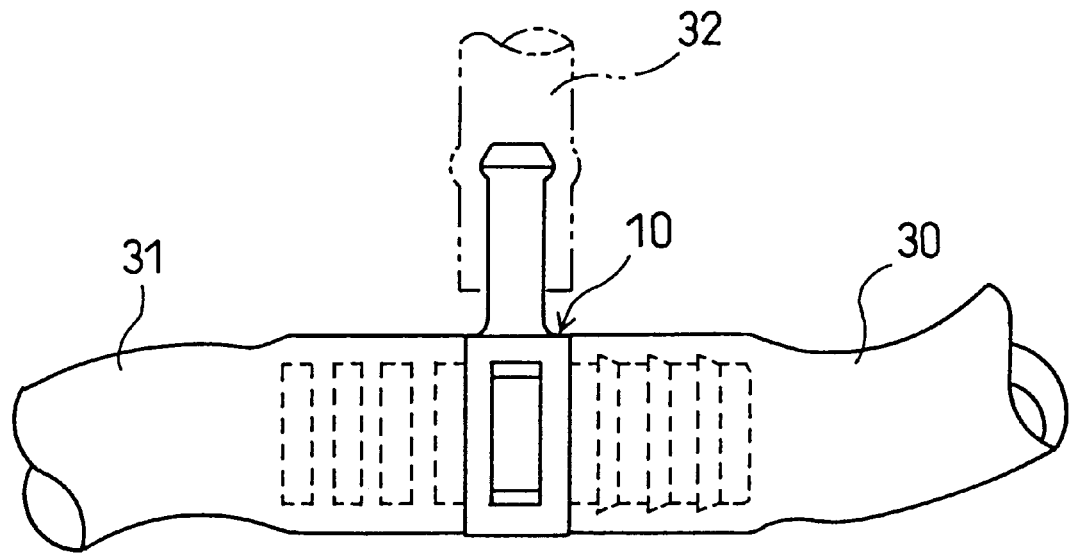
FIG. 1 is a front view illustrating an embodiment of a hose connecting assembly in accordance with the present invention.

FIG. 1 is a front view illustrating an embodiment of a hose connecting assembly in accordance with the present invention. The hose connecting assembly can be installed in an engine room of an automobile. Referring to FIG. 1, the hose connecting assembly includes a connection tube 10, two hoses 30 and 31 joined with both ends of the connection tube 10, and a branched hose 32 joined with a middle portion of the connection tube 10. The hoses 30 and 31 connect a non-illustrated engine with a non-illustrated radiator, whereas the branched hose 32 is connected to a throttle body.

Figure 2:
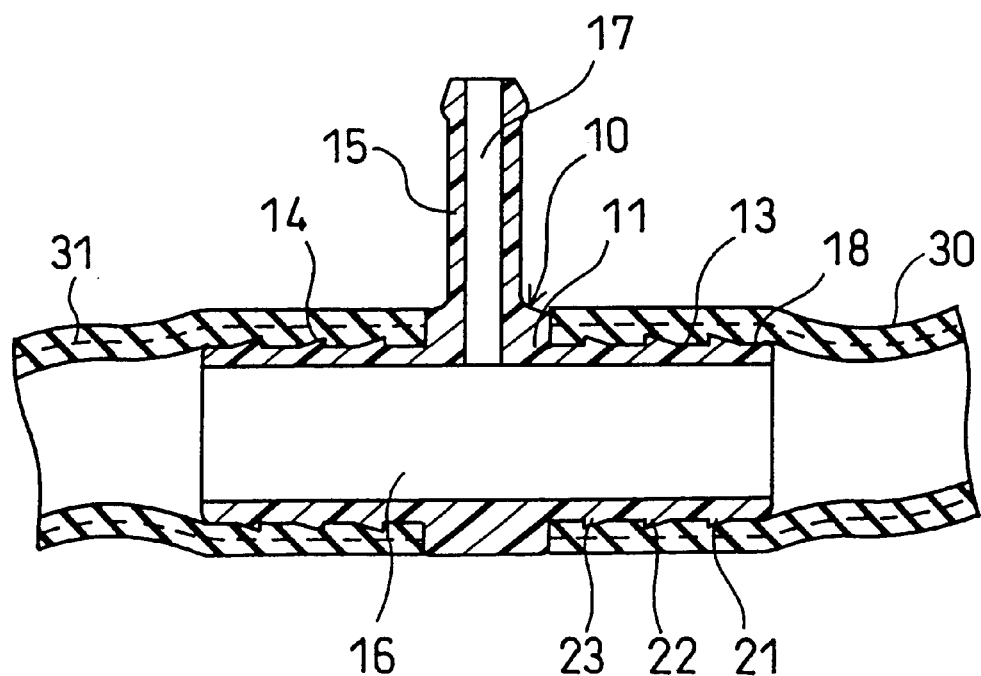
FIG. 2 is a cross sectional view illustrating the vicinity of a hose connecting tube and a hose.

FIG. 2 is a cross sectional view illustrating the connection tube 10 and the hoses 30 and 31. The connection tube 10 is a resin tubular body, which branches in three different directions and is obtained by injecting fiber glass-reinforced 6-6 nylon. The connection tube 10 includes a tubular main body 11, hose connecting tubes 13 and 14 integrally formed with the tubular main body 11 at its respective ends, and a branch tube 15 projected from a middle portion of the tubular main body 11. A main flow path 16 connecting with the hoses 30 and 31 is formed inside the tubular main body 11 and the hose connecting tubes 13 and 14. A branch flow path 17, which branches off the main flow path 16, is formed inside the branch tube 15.

Figure 3:
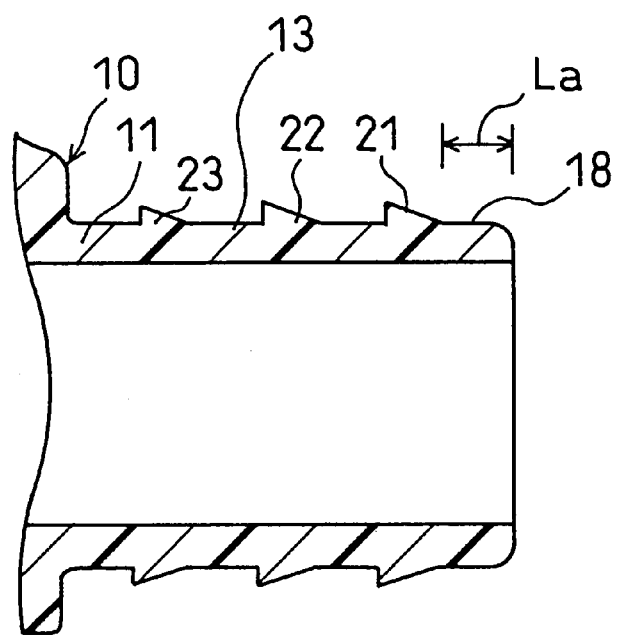
FIG. 3 is an enlarged cross sectional view illustrating the vicinity of the se connecting tube.
Figure 5:
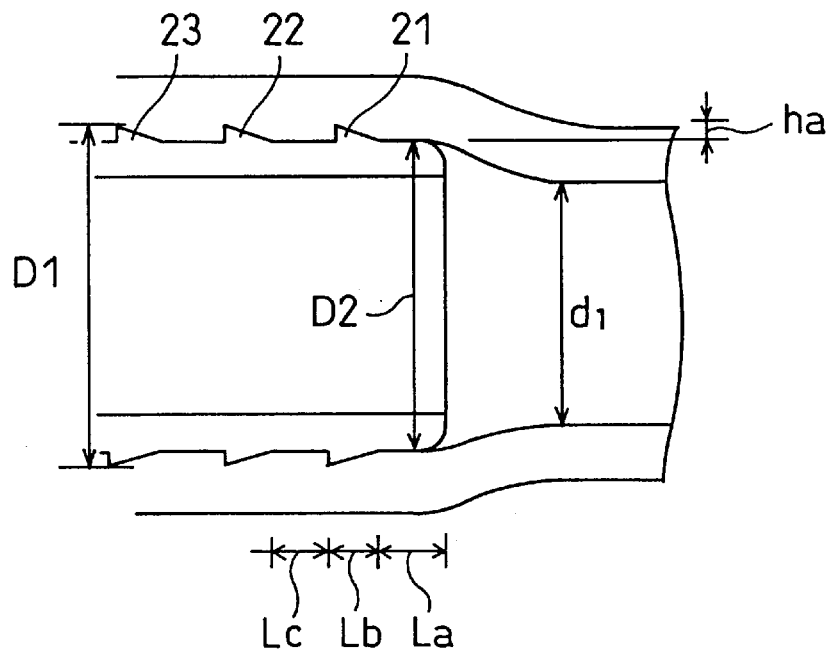
FIG. 5 shows the definition of a diameter expansion rate of the hose.

The hose connecting tubes 13 and 14 are symmetrical and have an identical configuration. The following description accordingly regards the hose connecting tube 13. FIG. 3 is an enlarged cross sectional view illustrating the hose connecting tube 13, and FIG. 5 shows the dimensions thereof. Referring to FIGS. 3 and 5, the hose connecting tube 13 includes a hollow cylindrical end 18 that is formed at the free end of the hose connecting tube 13 by a length La. The hollow cylindrical end 18 has an outer diameter D2, which is greater than an inner diameter d1 of the hose 30. The circumferential part of the free end of the hollow cylindrical end 18 is rounded.

Figure 4:
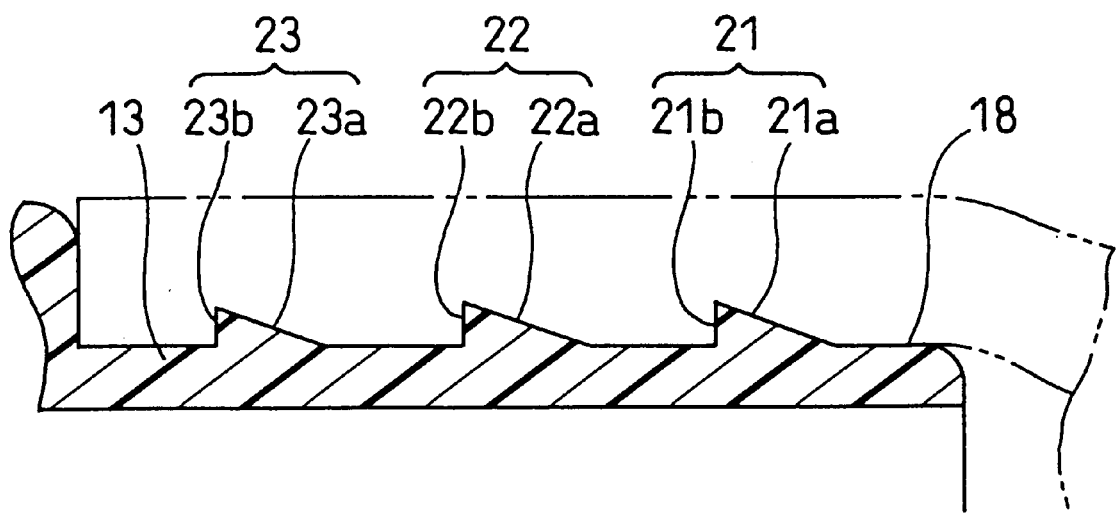
FIG. 4 is a cross sectional view illustrating the vicinity of a ring-shaped projection.

Three ring-shaped projections 21, 22, and 23 are formed around the surface of the hose connecting tube 13 at regular intervals between the hollow cylindrical end 18 and the middle portion of the tubular main body 11. As illustrated in FIG. 4, the ring-shaped projections 21, 22, and 23 have a right triangular cross section and respectively include truncated cone faces 21*a*, 22*a*, and 23*a*, which have outer diameters tapered toward the free end of the hose connecting tube 13, and acute-angled faces 21*b*, 22*b*, and 23*b*. The acute angle face 21*b*, 22*b*, and 23*b* and extend between the outer edges of the truncated cone faces 21*a*, 22*a*, and 23*a* and the base circumference of the hose connecting tube 13, and have an acute angle with the truncated cone faces 21*a*, 22*a*, and 23*a*, respectively.

The ring-shaped projections 21, 22, and 23 expand the diameter of the hose 30 as shown in FIG. 5, when the hose connecting tube 13 is inserted into the hose 30. The ring-shaped projections 21, 22, and 23 are designed to make a diameter expansion rate T, which is defined by Equation (3) given below, at least 25%.

$$T=(D1-d1)\times 100/d1 \tag{3}$$

The diameter expansion rate T represents the rate of partial expansion of the hose 30 having the inner diameter d1 to an outer diameter D1 of the ring-shaped projections 21, 22, and 23.

Figure 6:
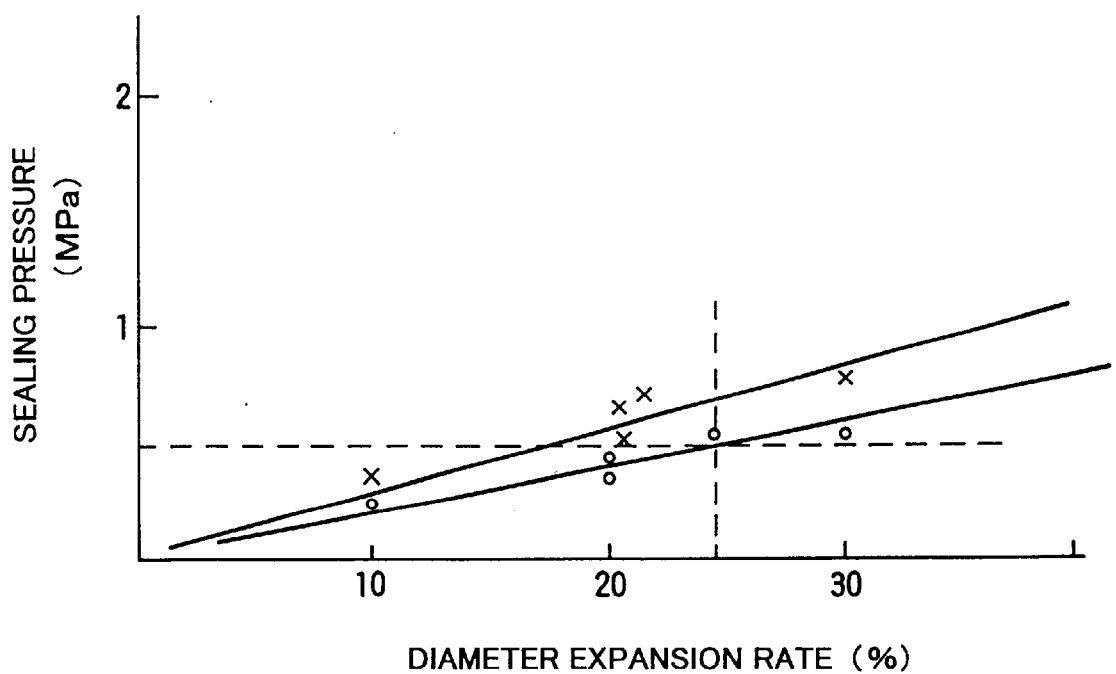
FIG. 6 is a graph showing the sealing pressure plotted against the diameter expansion rate.

FIG. 6 is a graph showing the sealing pressure plotted against the diameter expansion rate T for a hose having an inner diameter change rate Dc of 22.5%. The inner diameter change rate Dc, given by Equation (4), represents the rate of expansion of the hose 30 which has an inner diameter d1 with no pressures and which is expanded to have an inner diameter d2 under application of the inner pressure of 0.49 MPa.

$$Dc=(d2-d1)\times 100/d1 \tag{4}$$

As shown in the graph of FIG. 6, the sealing pressure is proportional to the diameter expansion rate T. Namely the sealing pressure increases with an increase in diameter expansion rate T. In the case of a cooling hose in an automobile, the standard working pressure is 0.1 MPa. It is, however, preferable that the diameter expansion rate T is not less than 25%, in order to take into account the safety factor in design and ensure the sealing pressure of not less than a standard design value of 0.49 MPa.

Figure 7:
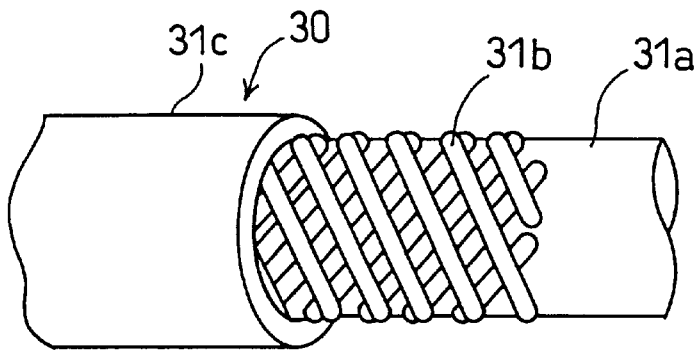
FIG. 7 is a partly broken side view illustrating the hose of the embodiment.
Figure 8:
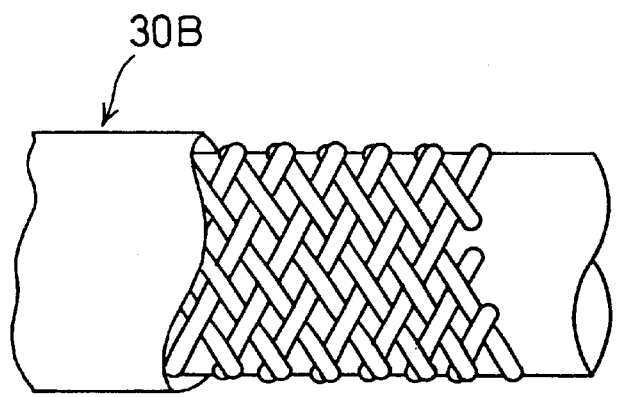
FIG. 8 is a partly broken side view illustrating a hose of a modified structure.
Figure 9:
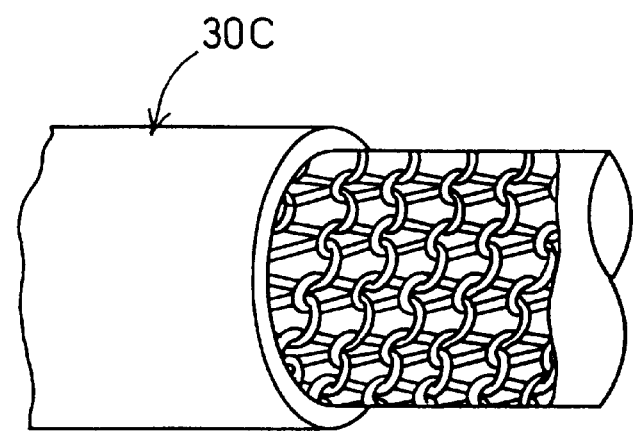
FIG. 9 is a partly broken side view illustrating a hose of another modified structure.

FIG. 7 is a partly broken side view of the hose 30. The hose 30 has a three-layered structure including a thread-reinforced layer in a rubber tubular body. Namely the hose 30 includes an inner layer 31*a* made of an EPDM rubber, a thread-reinforced layer 31*b* made of reinforcing threads that are spirally networked, and an outer layer 31*c* made of an EPDM rubber. As long as the following conditions are fulfilled, the hose 30 including the spirally networked reinforcing threads may be replaced with a hose 30B including braided reinforcing threads as shown in FIG. 8 or with a hose 30C including knitted reinforcing threads as shown in FIG. 9.

Figure 10:
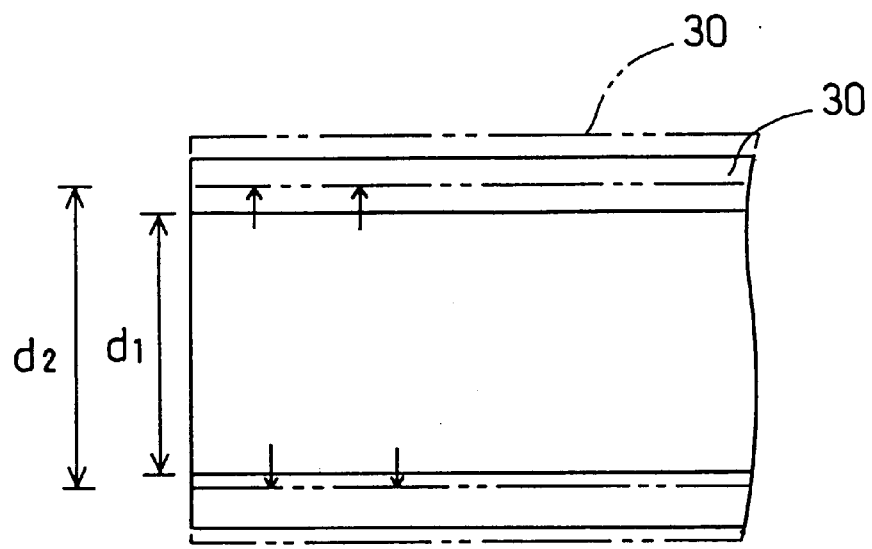
FIG. 10 show a state in which the hose is expanded under application of an inner pressure.

The hose 30 is designed to make an inner diameter change rate Dc, which is defined by Equation (4) given below, less than or equal to 23%. FIG. 10 shows the hose 30 expanded under application of an inner pressure. The inner diameter d2 under pressure may not be measurable but may be converted from the observed outer diameter of the hose 30, since the wall thickness of the hose 30 hardly changes under pressure.

Figure 11:
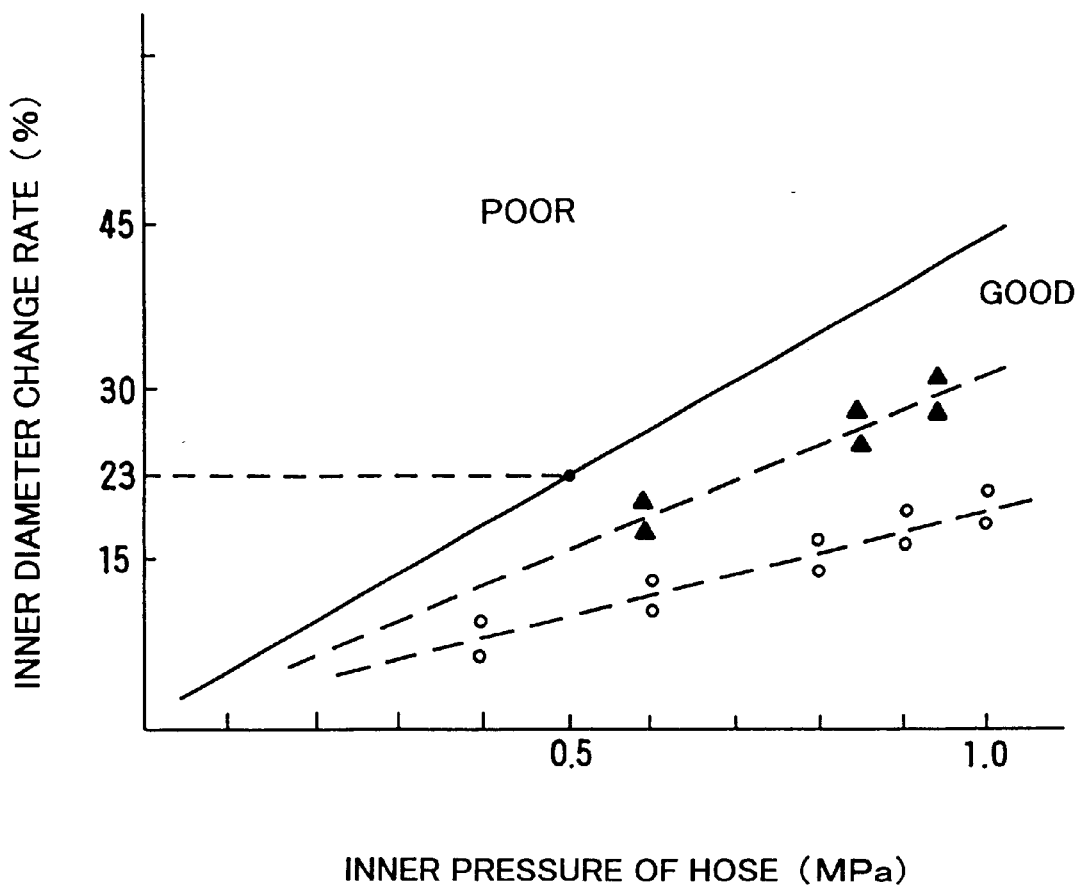
FIG. 11 is a graph showing the inner diameter change rate plotted against the inner pressure of the hose.

The reason why the inner diameter change rate Dc is set to be less than or equal to 23% is as follows. FIG. 11 shows some examples of the relation between the inner diameter change rate Dc and the inner pressure of a hose. The inner pressure applied to the hose 30 and the inner diameter change rate DC have a substantially proportional relationship as shown by the broken lines in the graph of FIG. 11. If the inner diameter change rate Dc exceeds 23% under the inner pressure of 0.49 MPa (that is, the area above the solid line in FIG. 11), a reaction force sufficient to limit to the expansion against a fluid pressure will not be generated. Accordingly, it is preferable that the inner diameter change rate Dc is less than or equal to 23% when a standard value of the inner pressure applied to the hose 30 is set equal to 0.49 MPa. The hose 30 having the smaller inner diameter change rate Dc against the inner pressure has a higher expansion resistance against the inner pressure. This property is obtained by providing the thread-reinforced layer 31*b* inside the hose 30.

It is preferable that at least the outer layer 31*c* of the hose 30 is made of EPDM rubber. The EPDM rubber has excellent resistance against ozone and does not crack even with long-term use in the diameter-expanding state.

In the hose connecting assembly described above, when the hose connecting tube 13 of the connection tube 10 is pressed into the hose 30 in such a manner that the hose 30 climbs over the ring-shaped projections 21, 22, and 23, the ring-shaped projections 21, 22, and 23, which have the outer diameter D1 greater than the inner diameter d1 of the hose 30, partly expand the inner wall of the hose 30. Since the hose 30 is designed to have the inner diameter change rate Dc of less than or equal to 23%, a large reaction force is generated against the expanding force.

Since the hose 30 exerts a large force that limits the expansion under application of the inner pressure, when the ring-shaped projections 21, 22, and 23 expand the diameter of the hose, a large clamping force is generated as the reaction force against the hose connecting tube 13. The hose 30 having such a large clamping force does not readily come off the hose connecting tube 13 and ensures a sufficiently large sealing property. Namely the hose 30 is securely joined with the hose connecting tube 13 without any specific clamping mechanism, such as clips.

Since the ring-shaped projections 21, 22, and 23 have the acute-angle corners defined by the truncated cone faces 21*a*, 22*a*, and 23*a* and the acute-angled faces 21*b*, 22*b*, and 23*b*, there is a large pull-out resistance when a pulling force is applied to the hose 30.

The hose connecting tube 13 has the hollow cylindrical end 18 extending from the free end of the hose connecting tube 13 toward the ring-shaped projections 21, 22, and 23. The hollow cylindrical end 18 has the outer diameter D2, which is a little greater than the inner diameter d1 of the hose 30 and is in close contact with the hose 30 before the diameter of the hose 30 is expanded by the ring-shaped projections 21, 22, and 23. The hose 30 is thus continuously in close contact with the hollow cylindrical end 18 between the free end of the hose connecting tube 13 and the ring-shaped projections 21, 22, and 23, which expand the diameter of the hose 30. The hollow cylindrical end 18 causes the hose 30 to be in close contact with its smooth surface between the free end of the hose connecting tube 13 and the ring-shaped projections 21, 22, and 23 even when the hose 30 is exposed to vibrations. The hose 30 can accordingly keep a tight seal against the hose connecting tube 13 even when used at a low-temperature, and the vibrations are repeatedly applied to the hose 30.

Figure 12:
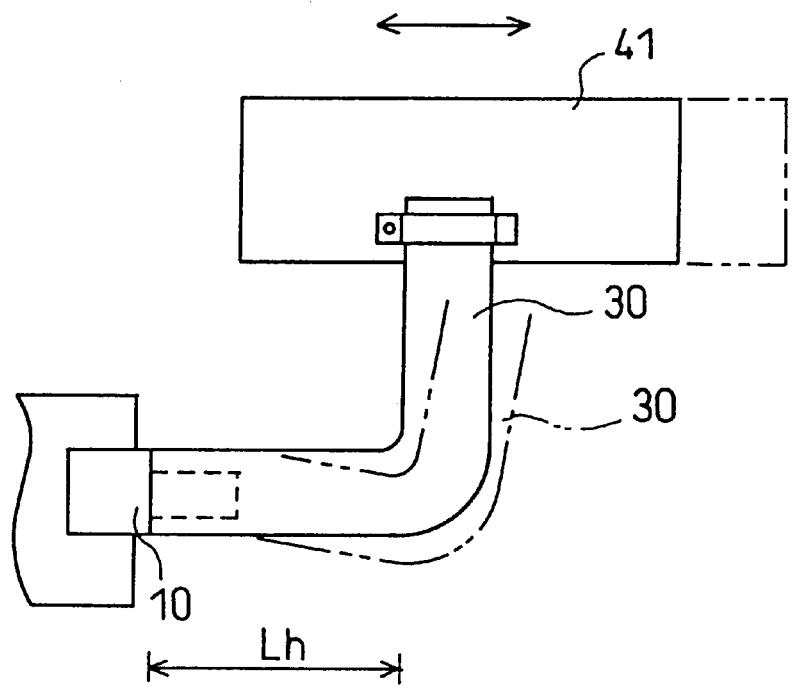
FIG. 12 shows a vibration test carried out while the hose is connected to the hose connecting tube.

A test shown in FIG. 12 was performed to measure the effect of the hollow cylindrical end 18 provided in the connection tube 10 on the seal. FIG. 12 shows a vibration test carried out while the hose 30 was joined with the connection tube 10. In the test of FIG. 12, the measurement was carried out in the state that the hose 30 was connected to the connection tube 10 and bent at a substantially right angle by a length Lh equal to 100 mm. The hose 30 was bent in this manner by taking into account the hose layout conditions, for example, in an engine room. The hose 30 had the following dimensions: the inner diameter d1 equal to 16 mm φ, the wall thickness t1 equal to 4 mm, the thickness of the inner layer 31a equal to 2 mm, and the thickness of the outer layer 31c equal to 2 mm. The hose connecting tube 13 had the following dimensions shown in FIG. 5: the length La equal to 4 mm, the length Lb equal to 3 mm, the length Lc equal to 4 mm, the outer diameter D1 equal to 21.6 mm, the outer diameter D2 equal to 1.96 mm, and the height ha equal to 1 mm. Referring back to FIG. 12, one end of the hose 30 was joined with one end of the connection tube 10, which was fixed to a stand, whereas the other end of the hose 30 was fixed to a vibration plate 41. While the vibration plate 41 was vibrated at the frequency of 13.3 Hz and the amplitude of 7.5 cm in an atmosphere of −30° C., the pressure of the fluid flown through the hose 30 was gradually increased. The pressure was measured when the fluid leaked from the joint of the connection tube 10 with the hose 30. A prior art connection tube without the hollow cylindrical end 18 was also examined in the same manner as a comparative example.

The prior art branched pipe had a leakage of the fluid under the inner pressure of less than or equal to 0.1 MPa, whereas there was no leakage of the fluid up to the inner pressure of 0.35 MPa in the structure of this embodiment. The above experiment was also carried out when the length of the hollow cylindrical end 18 was changed to 5 mm and 7 mm. Substantially similar pressure resistance results were obtained.

Figure 13:
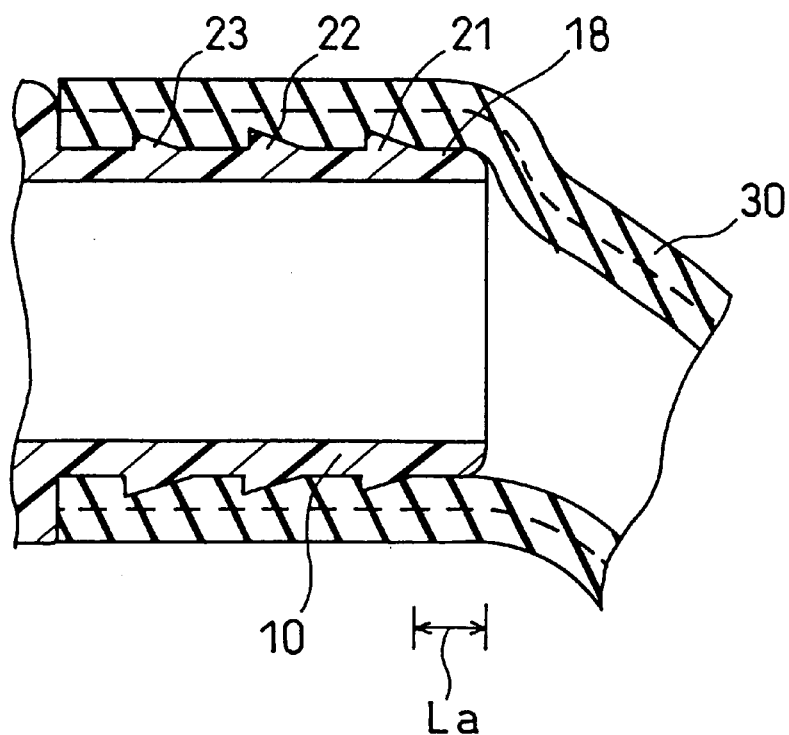
FIG. 13 shows functions of a hollow cylindrical end of the hose connecting tube.

As illustrated in FIG. 13, the results of the experiment show that the hollow cylindrical end 18 formed at the free end of the hose connecting tube 13 is in close contact with the hose 30 to ensure an excellent sealing property while the ring-shaped projections 21, 22, and 23 expand part of the hose 30. The increase in length of the hollow cylindrical end 18 enhances the sealing effect. A length of greater than about 7 mm, however, undesirably increases the frictional force when the hose connecting tube 13 is inserted into the hose 30, and results in the poor insertion workability. Accordingly, it is preferable that the hollow cylindrical end 18 has a length of less than or equal to about 7 mm.

FIG. 14 through 18 show the effect of changing the length of the hose into which the hose connecting tube 13 is pressed.

Figure 14:
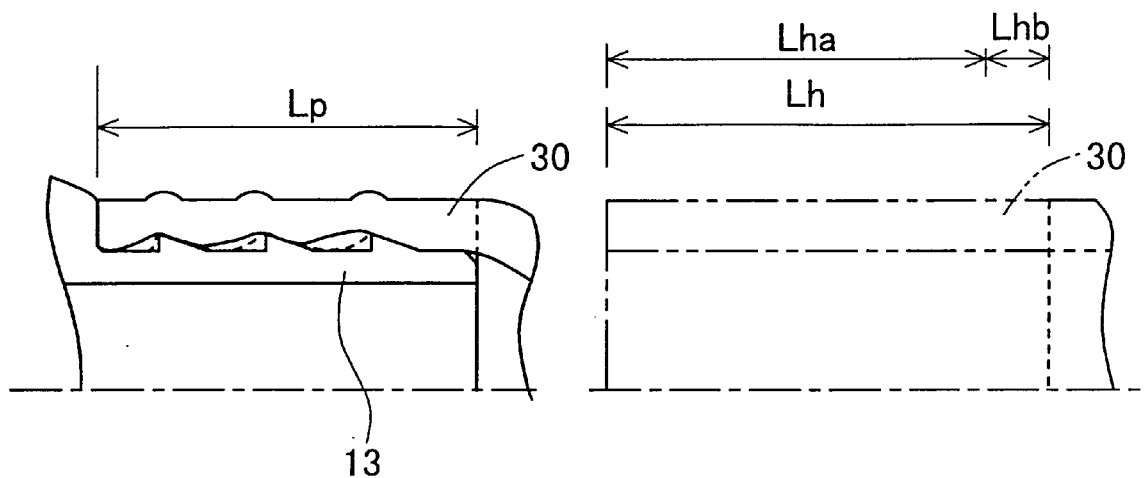
FIG. 14 shows a state in which the hose is secured to the hose connecting tube over the length of the hose connecting tube.

FIG. 14 shows the state in which the hose 30 is joined with the hose connecting tube 13 over the length of the hose connecting tube 13. The hose 30 is secured to the hose connecting tube 13 at a press fit factor Lh/Lp in the range of 1.05 to 1.4, where Lp denotes the length of the hose connecting tube 13 and Lh denotes a length of the hose 30, into which the hose connecting tube 13 is pressed.

Figure 15:
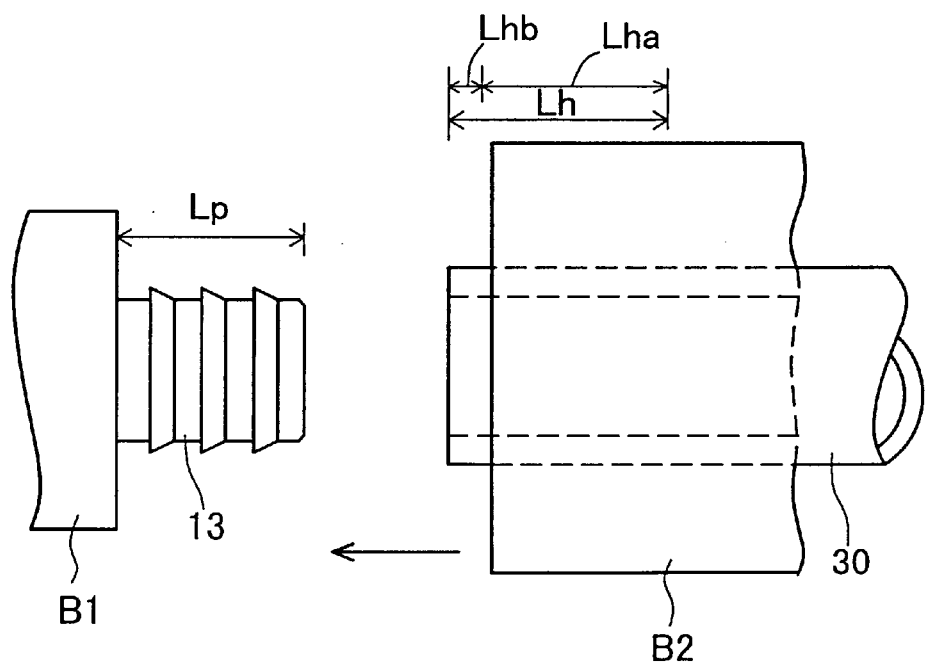
FIG. 15 shows a process of pressing the hose connecting tube into the hose.
Figure 16:
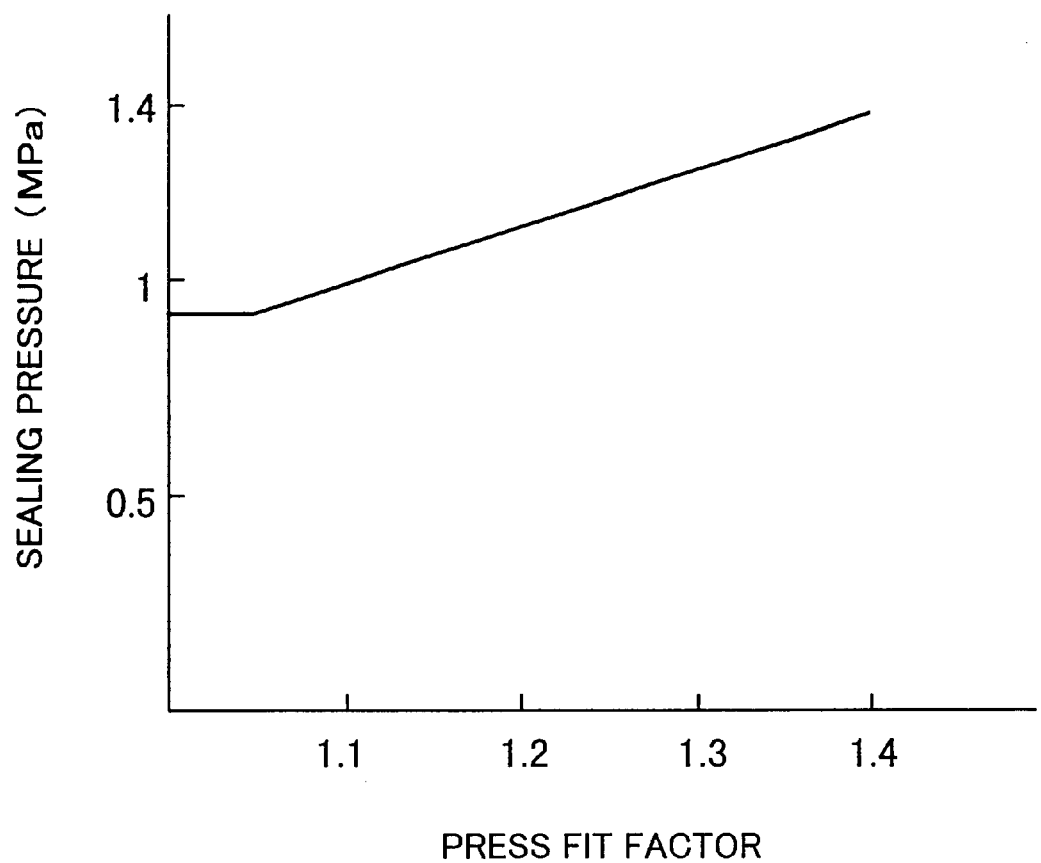
FIG. 16 is a graph showing the sealing pressure plotted against the press fit factor.

The arrangement of securing the hose 30 to the hose connecting tube 13 over the length of the hose connecting tube 13 enhances the sealing property. This effect was measured by an experiment discussed below. Referring to FIG. 15, the hose connecting tube 13 was fixed on one end to a first block B1 and protruded by a length Lp from the first block B1. The hose 30 was, on the other hand, fixed to a second block B2 at a position of Lh (=Lha+Lhb) from its free end and protruded by a press fit length Lhb from an end face of the second block B2. The first block B1 was moved relative to the second block B2 to come into contact with the second block B2, so that the hose connecting tube 13 was pressed into the hose 30. The press fit length Lhb of the hose 30 was changed by varying the position of fixation of the hose 30 to the second block B2. In a variety of cases, the sealing pressure was measured after exposure to an atmosphere of 120° C. for 250 hours. FIG. 16 is a graph showing the sealing pressure plotted against the press fit factor Lh/Lp. As clearly understood from the graph of FIG. 16, the sealing pressure increases in a substantially proportional manner when the press fit factor Lh/Lp is in the range of 1.05 to 1.4.

Figure 17A:
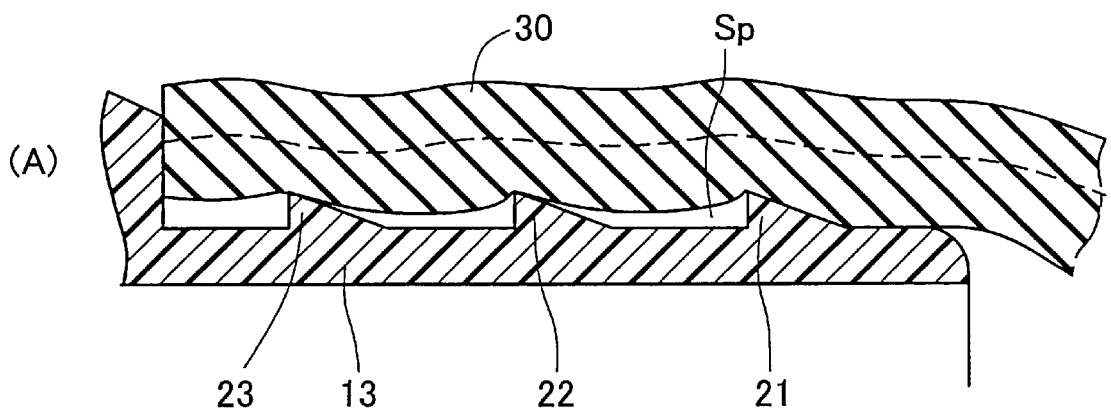
FIGS. 17(A) and 17(B) show states at different press fit factors.
Figure 17B:
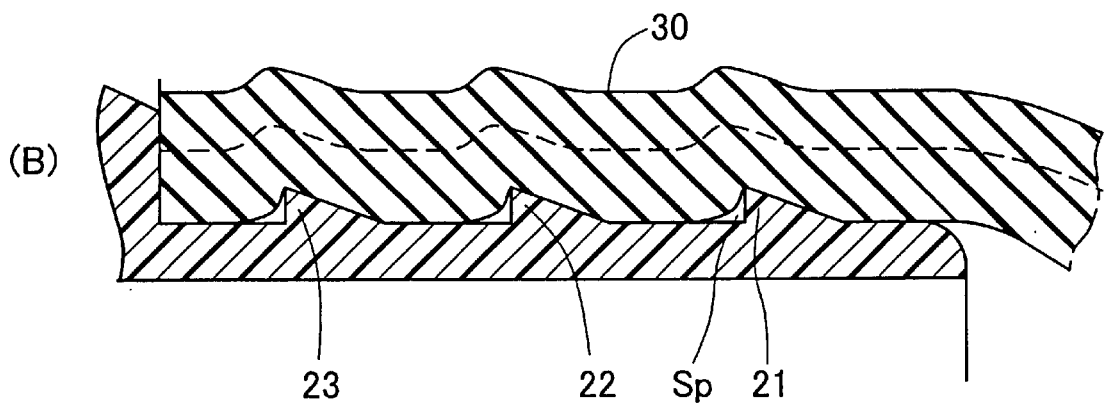

The increase in sealing pressure can be ascribed to the reason discussed below. FIGS. 17A and 17B show different press fit factor Lh/Lp cases. FIG. 17A shows the case of a small press fit factor Lh/Lp, and FIG. 17B shows the case of a large press fit factor Lh/Lp. In the case of a small press fit factor Lh/Lp, there is a large gap Sp between the hose connecting tube 13 and the inner circumferential surface of the hose 30 as shown in FIG. 17A. This results in decreased contact area of the hose 30 with the hose connecting tube 13. The contact area of the hose 30 with the hose connecting tube 13 is increased an increase in press fit factor Lh/Lp as shown in FIG. 17B. The increase in contact area of the hose 30 with the hose connecting tube 13 enhances the seal.

The following mechanism may alternatively be applied to increase the contact area of the hose 30 with the hose connecting tube 13 and to improve the seal. When the hose connecting tube 13 is inserted into the hose 30, the ring-shaped projections 21, 22, and 23 expand the diameter of the hose 30. The gap Sp between the hose 30 and the hose connecting tube 13 is measured against the degree of the diameter expansion. When the hose connecting tube 13 is inserted into the hose 30, the hose 30 is expanded at the diameter expansion rate T defined by Equation (2) given previously. The diameter expansion rate T represents the rate of partial expansion of the hose 30 having the inner diameter d1 to the outer diameter D1 of the ring-shaped projections 21, 22, and 23.

Figure 18:
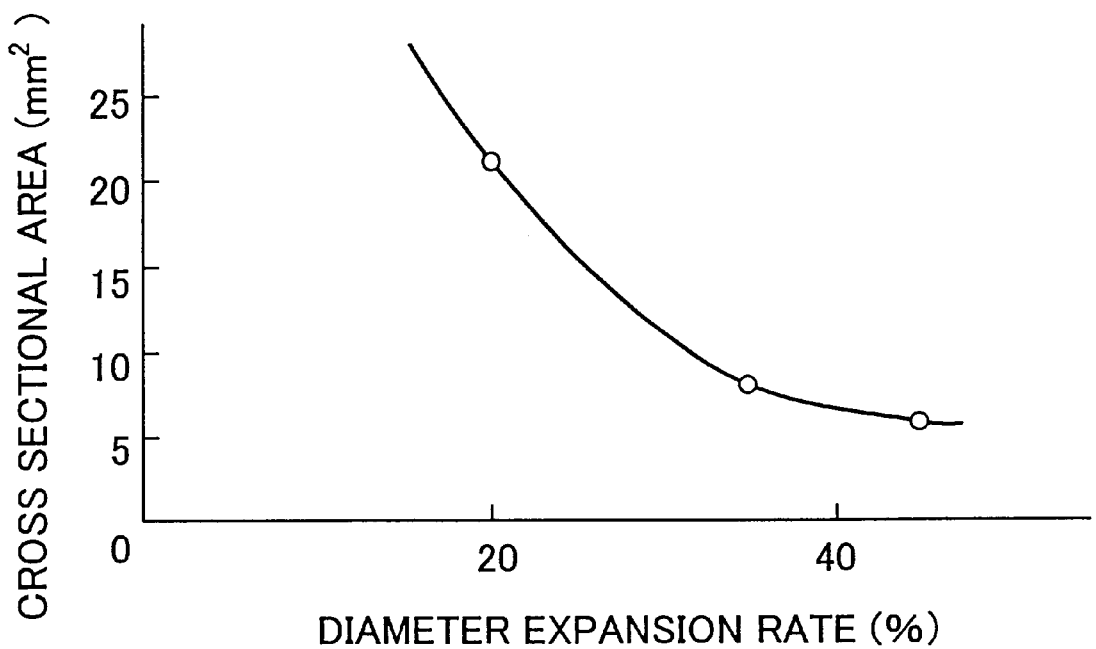
FIG. 18 is a graph showing the cross sectional area of the gap plotted against the diameter expansion rate.

FIG. 18 is a graph showing the cross sectional area of the gap Sp plotted against the diameter expansion rate T. The cross sectional area of the gap Sp was measured in the cases when the diameter expansion rate T was equal to 20%, 35%, and 45%, respectively. A variation in cross section was observed by photographing a face cut in the axial direction and causing the photographed face to be subjected to the image processing. The results of the measurement show that the cross section decreases with an increase in diameter expansion rate T. The diameter expansion rate T is proportional to the sealing pressure as discussed previously in FIG. 6. Namely an increase in the diameter expansion rate T decreases the cross sectional area of the gap Sp and increases the contact area; thereby enhancing the sealing pressure.

It is preferable that the ratio S1/S0 is less than or equal to 0.95, where S0 denotes a cross sectional area of a gap Sp defined by an inner wall of the hose and the hose connecting tube 13 at a press fit factor of 1, and S1 denotes a cross sectional area of the gap Sp when the hose connecting tube 13 is pressed into the hose 30. The press fit factor of 1 is defined as Lh/Lp where Lp denotes a length of the hose connecting tube 13 and Lh denotes a length of the hose 30, into which the hose connecting tube 13 is pressed. This arrangement also enables the hose expanded by the ring-shaped projection to adhere tightly to the outer circumferential surface of the hose connecting tube 13 and ensure the tight seal.

The cross sectional area of the gap Sp decreases with a decrease in inner diameter change rate Dc of the hose 30, which is defined by Equation (1) given previously. The inner diameter change rate Dc represents the rate of expansion of the hose 30 having the inner diameter d1 to the inner diameter d2 under application of the inner pressure of 0.49 MPa.

The inner pressure applied to the hose 30 is proportional to the inner diameter change rate Dc as shown by the broken lines in the graph of FIG. 11. If the inner diameter change rate Dc exceeds 23% under an inner pressure of 0.49 MPa (that is, the area above the solid line in FIG. 11), then there is only a small force limiting the expansion under application of a fluid pressure, and there is no sufficient reaction force in the diameter-expanding state. Accordingly, it is preferable that the inner diameter change rate Dc is less than or equal to 23% when a standard value of the inner pressure applied to the hose 30 is equal to 0.49 MPa. The hose 30 having the smaller inner diameter change rate Dc against the inner pressure has a higher expansion resistance against the inner pressure and a smaller cross sectional area of the gap Sp. This property is obtained by providing the thread-reinforced layer 31b inside the hose 30.

Figure 19:
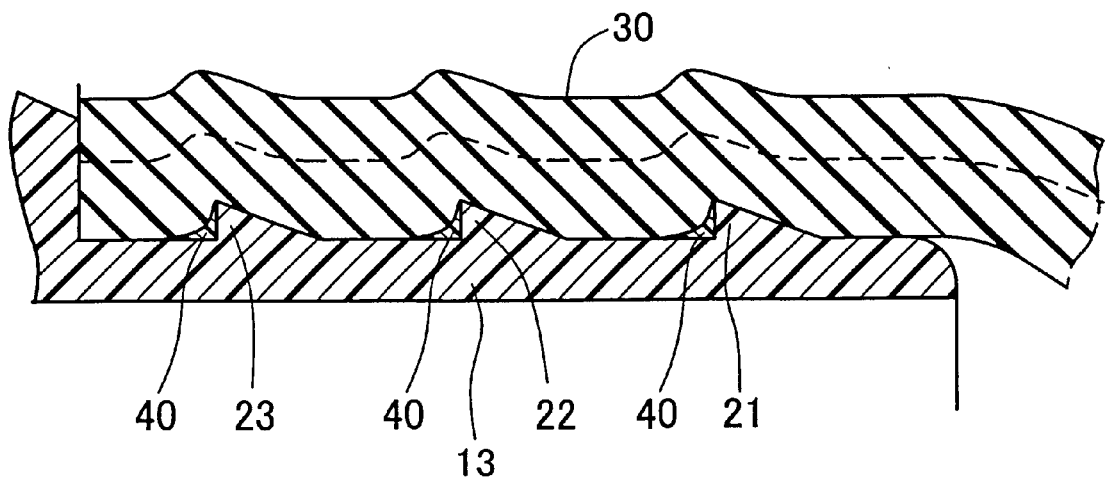
FIG. 19 is an enlarged cross sectional view illustrating another hose connecting assembly in another embodiment according to the present invention.

FIG. 19 is an enlarged cross sectional view illustrating another hose connecting assembly in another embodiment according to the present invention. The corner gaps of the ring-shaped projections 21, 22, and 23 protruded from the outer circumferential surface of the hose connecting tube 13 are filled with elastomer fillers 40 that have adhesion properties to both the hose 30 and the hose connecting tube 13. The fillers 40 may, for example, be a silicone sealant. When the hose connecting tube 13 is inserted into the hose 30, the fillers 40 come into contact with the inner wall of the hose 30. The fillers 40 are in close contact with the inner wall of the hose 30 without the high press fitting force of the hose 30 and thereby enhance the sealing property. The fillers 40 are made of a material that has the adhesion properties to both the hose 30 and the hose connecting tube 13. This prevents the fillers 40 from readily coming off and further enhances the sealing property. The fillers 40 may be constructed as separate elements or integrally formed with the hose connecting tube 13.

Figure 20:
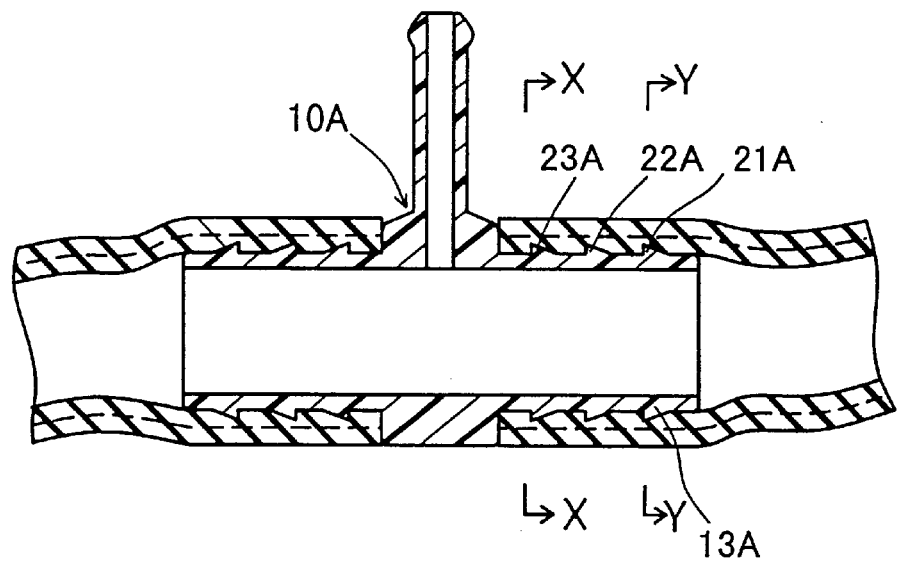
FIG. 20 is a cross sectional view illustrating still another hose connecting assembly in still another embodiment according to the present invention.
Figure 21A:
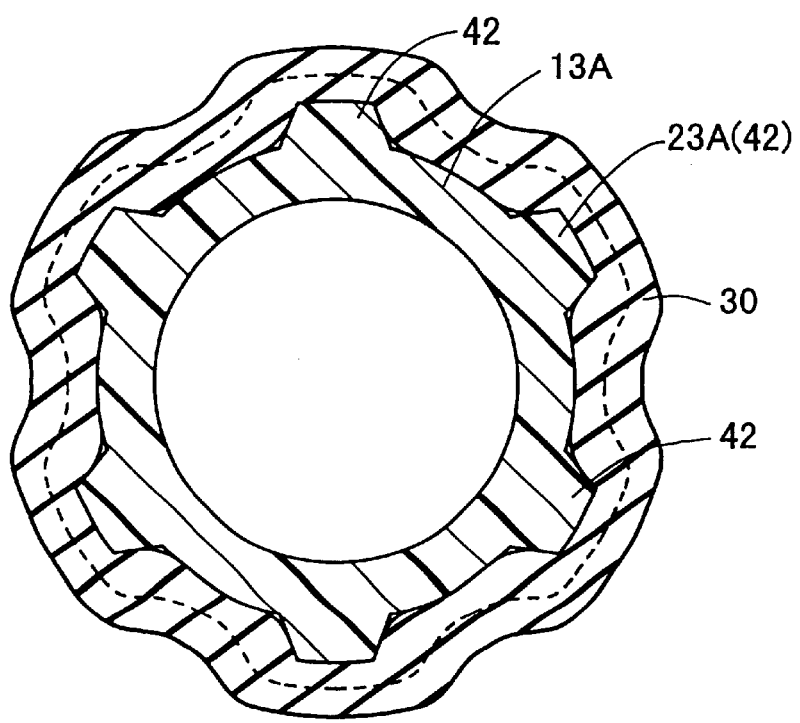
FIG. 21(A) is a cross sectional view taken on the line X—X of FIG. 20.
Figure 21B:
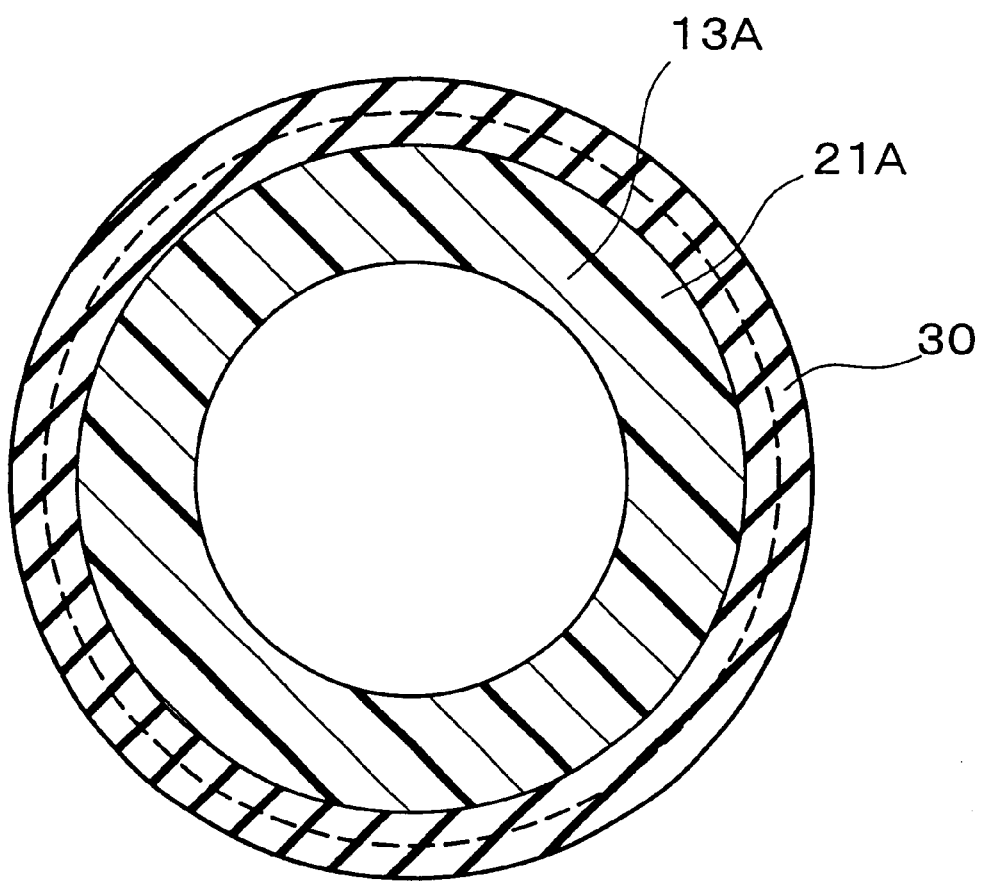
FIG. 21(B) is a cross sectional view taken on the line Y—Y of FIG. 20.

FIG. 20 is a cross sectional view illustrating still another hose connecting assembly in still another embodiment according to the present invention. FIG. 21 is a cross sectional view taken on the line X—X of FIG. 20. Referring to FIGS. 20 and 21, a hose connecting tube 13A of a connection tube 10A has ring-shaped projections 21A, 22A, and 23A. A plurality of detents 42 are formed on the ring-shaped projection 23A as shown in FIG. 21A while the other two projections 21A and 22A do not have such detents as shown in FIG. 21B. The detents 42 are protruded from the outer circumferential base of the hose connecting tube 13A and arranged along its circumference at the interval of 60 degrees to form a gear-like shape. When the hose connecting tube 13A is pressed into the hose 30, the detents 42 are pressed against the inner wall of the hose 30 and prevent the hose 30 from rotating in the circumferential direction relative to the hose connecting tube 13A. Even when the hose 30 is subjected to vibrations, this arrangement effectively prevents the hose 30 from being revolved relative to the hose connecting tube 13A, and maintains sufficient adhesion and a sufficient seal. The ring-shaped projection 23A is formed in the third row among the three ring-shaped projections 21A, 22A, and 23A. Since the ring-shaped projection 21A without the detents in the first row ensures the tight seal, the formation of the detents 42 in the projection 23A does not damage the effectiveness of the seal.

Figure 22:
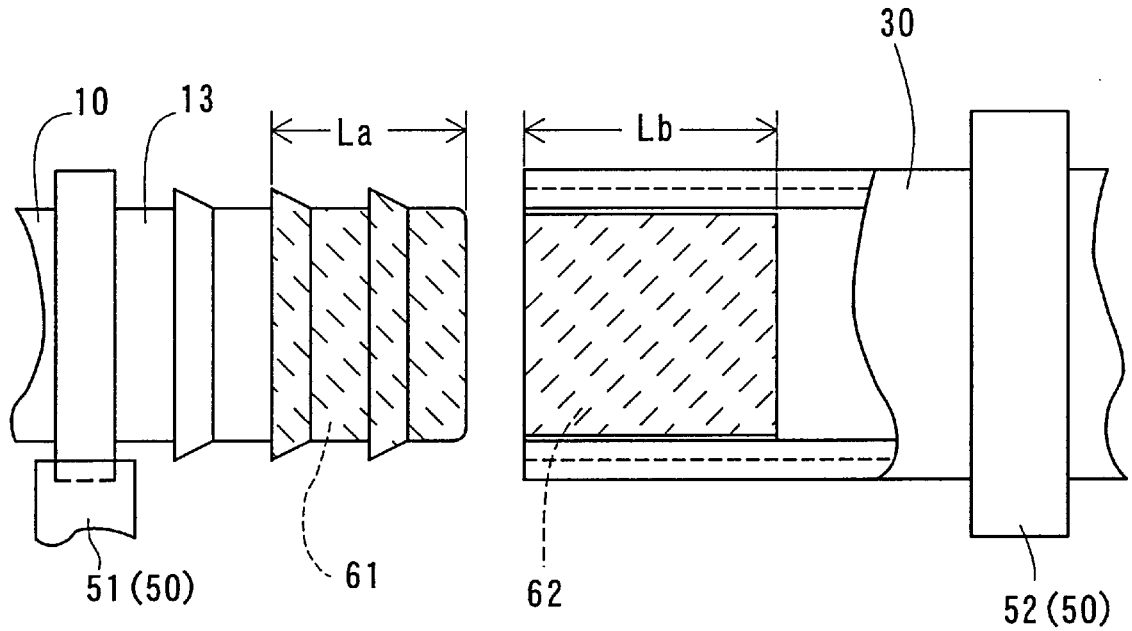
FIG. 22 shows a process of pressing the hose connecting tube into the hose.
Figure 23:
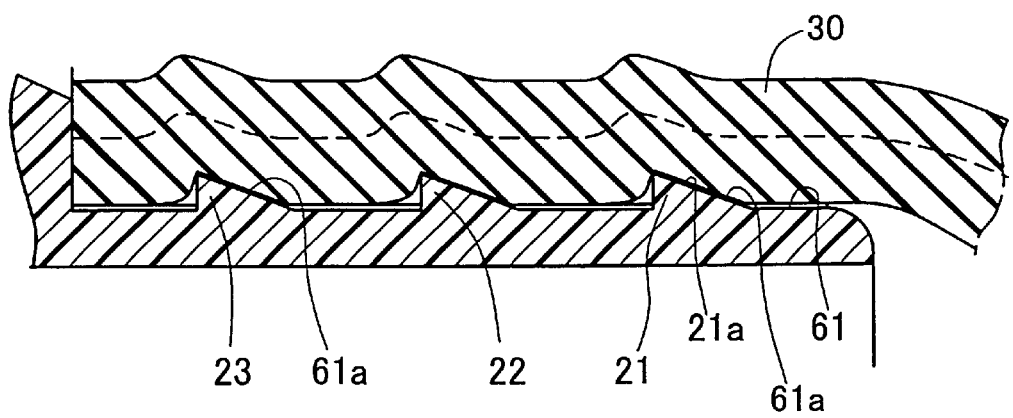
FIG. 23 is an enlarged sectional view illustrating another hose connecting assembly in still another embodiment according to the present invention.

The following describes a process that facilitates the insertion of the hose connecting tube 13 into the hose 30. FIG. 22 shows the state prior to the insertion of the hose connecting tube 13 into the hose 30, and FIG. 23 is a sectional view illustrating the state in which the hose connecting tube 13 is pressed in the hose 30. Referring to FIG. 22, an automatic hose insertion machine 50 is used to press the hose connecting tube 13 into the hose 30. A fixation unit 51 of the automatic hose insertion machine 50 fixes a central portion of the connection tube 10, whereas a chuck 52 fixes one end of the hose 30. An adhesive 61 is applied on an outer circumferential surface of the hose connecting tube 13 to a predetermined length La from the end of the hose connection tube 13, and an agent for insertion 62 is applied on an inner wall surface of the hose 30 to a predetermined length Lb from the end of the hose 30. The chuck 52 is then shifted to the fixation unit 51, so that the hose connecting tube 13 is pressed into the hose 30. The agent 62 on the inner wall surface of the hose 30 and the adhesive 61 on the outer circumferential surface of the hose connecting tube 13 function to reduce the friction coefficient on the interface and enable the smooth insertion.

The adhesive 61 used here preferably has the strong adhesive force both to the hose 30 and the hose connecting tube 13, as well as the thermosetting property at working temperatures of the hose 30. Preferable examples include isocyanate adhesives or epoxy adhesives.

The agent 62 used here preferably has the property of reducing the friction coefficient on the interface in the process of pressing the hose connecting tube 13 into the hose 30, as well as the property of being absorbed into the rubber of the hose 30 with an elapse of time not to interfere with the adhesion of the adhesive 61. An ester plasticizer or paraffin oil may be used preferably for the agent 62. Preferable examples of the ester plasticizer are phthalates, such as dibutyl phthalate, di-2-ethylhexyl phthalate (DOP), and di-n-octyl phthalate.

After the insertion, the adhesive 61 interposed between the inner wall surface of the hose 30 and the outer circumferential surface of the hose connecting tube 13 sets with an elapse of time and secure the joint of the hose 30 with the hose connecting tube 13 as shown in FIG. 23. Even if the hose 30 is exposed to a high temperature environment (about 120° C.) or a vibrating environment, for example, in an engine room and the fatigue of rubber of the hose 30 lowers the pressing force of the hose 30 against the hose connecting tube 13, the adhesion of the adhesive 61 ensures the tight seal. An adhesive layer 61a applied on the truncated cone face 21a of the hose connecting tube 13 is pressed especially strongly against the inner wall surface of the hose 30 and thereby attains the high adhesion between the hose 30 and the hose connecting tube 13. The adhesive force of the adhesive 61 does not require the hose 30 to have a thread-reinforced layer or to have a large diameter expansion rate.

Since the agent 62 including the ester plasticizer is absorbed into the inner wall of the hose 30 with an elapse of time and does not remain on the interface between the inner wall surface of the hose 30 and the outer circumferential surface of the hose connecting tube 13, the agent 62 does not interfere with the adhesion of the adhesive 61 but ensures the secure joint of the hose 30 with the hose connecting tube 13.

Although the adhesive 61 is applied on a relatively narrow area to the predetermined length La from the end of the hose connecting tube 13, pressing the hose connecting tube 13 into the hose 30 homogeneously spreads the adhesive 61 over the substantially whole interface between the inner wall surface of the hose 30 and the outer circumferential surface of the hose connecting tube 13. This saves the quantity of adhesive 61 used for the purpose of the secure joint.

The effects of the adhesion between the hose 30 and the hose connecting tube 13 via the adhesive 61 were evaluated by the following experiment. The experiment applied 0.15 g of the agent 62 (paraffin oil) on the inner wall surface of the hose 30 and 0.2 g of the adhesive 61 (isocyanate) on the outer circumferential surface of the hose connecting tube 13, and pressed the hose connecting tube 13 into the hose 30 at the press fit factor Lh/Lp 1.1 to complete a test piece. While an air pressure of 0.196 MPa was applied into the hose 30 of the test piece, one end of the hose 30 was exposed to one million times of elliptical vibrations. An assembly of the hose 30 and the hose connecting tube 13 without the adhesive 61 was prepared as a control piece and also exposed to the same vibrations. After the exposure, the seal of the joint was tested with regard to the test piece and the control piece under application of the varying air pressure. In the case of the control piece without the adhesive 61, there was a leak under the air pressure of 0.5 to 0.7 MPa. In the case of the test piece with the adhesive 61, on the other hand, there was no leak even under the air pressure of greater than 0.98 MPa. The test piece was also exposed to a stepwise pressure rise with water. There was no leak under the hydraulic pressure up to 1.69 MPa. This clearly proves the increased durability of the joint by means of the adhesive 61. Though the embodiment, in which the hose connecting tube is pressed into the hose at a press fit factor Lh/Lp in a range of 1.05 to 1.4 without the adhesive 61, fulfills sufficiently a standard of the durability, the embodiment with the adhesive 61 obtains the effect to overcome greatly over the standard.

In the above embodiment, the adhesive 61 is applied on the outer circumferential surface of the hose connecting tube 13, whereas the agent 62 is applied on the inner wall surface of the hose 30. As long as the sufficient adhesion and smooth insertion are attained, the adhesive 61 and the agent 62 may be applied on any part of or the whole of the inner wall surface of the hose 30 and the outer circumferential surface of the hose connecting tube 13. In one modified example, the agent 62 is applied on the outer circumferential surface of the hose connecting tube 13, and the adhesive 61 is applied on the inner wall surface of the hose 30. In another modified example, instead of using the agent 62, the adhesive may be applied both on the inner wall surface of the hose 30 and the outer circumferential surface of the hose connecting tube 13. In this case, the viscosity of the adhesive 61 reduces the friction coefficient on the interface in the course of the insertion.

In another embodiment, the adhesive 61 may be mixed with the agent 62, which is easily soluble with the adhesive 61, and applied onto either the hose 30 or the hose connecting tube 13. This reduces the quantity of the adhesive 61 used, enables to adjust the viscosity and the reactivity of the adhesive 61 and improves the handling properties.

Figure 24:
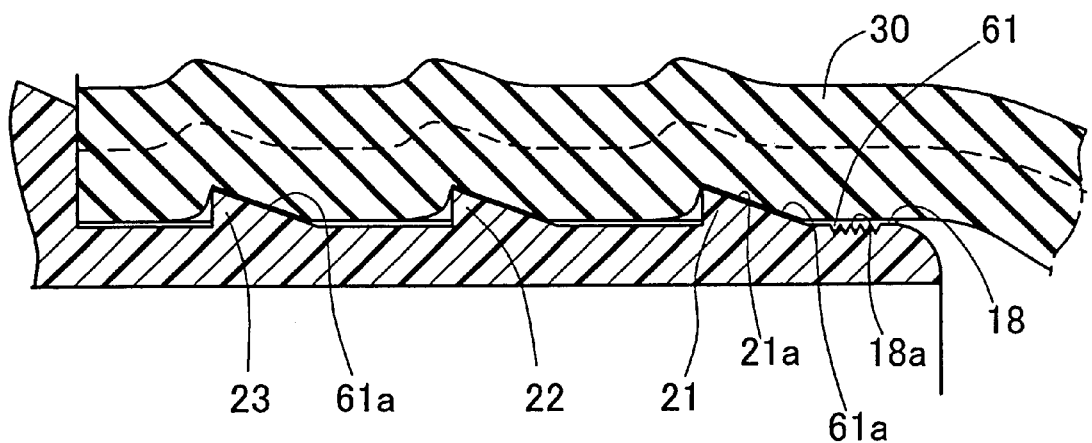
FIG. 24 is an enlarged sectional view illustrating still another hose connecting assembly in another embodiment according to the present invention.

FIG. 24 is a sectional view illustrating another hose connecting assembly in another embodiment according to the present invention. Referring to FIG. 24, the hollow cylindrical end 18 of the hose connecting tube 13 has a jagged part 18a along the outer circumference of the hollow cylindrical end 18. In the process of pressing the hose connecting tube 13 into the hose 30, the adhesive 61 is collected in the jagged part 18a, which ensures the secure joint of the hose connecting tube 13 with the hose 30.

Figure 25A:
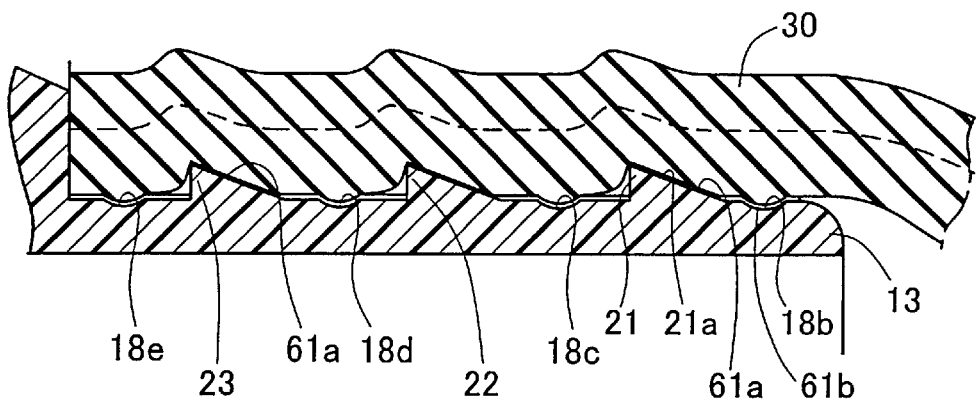
FIGS. 25(A), 25(B) and 25(C) are enlarged sectional views illustrating another hose connecting assembly in still another embodiment according to the present invention.
Figure 25B:
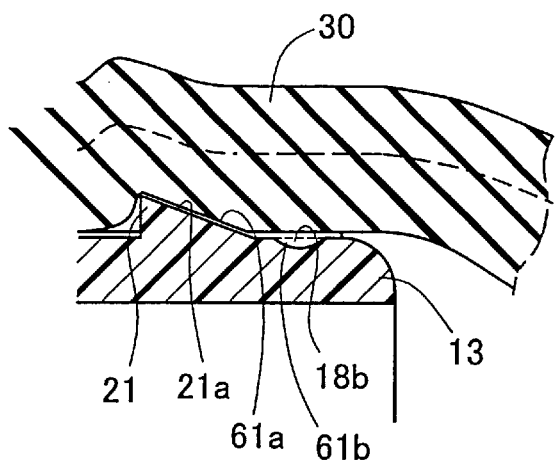
Figure 25C:
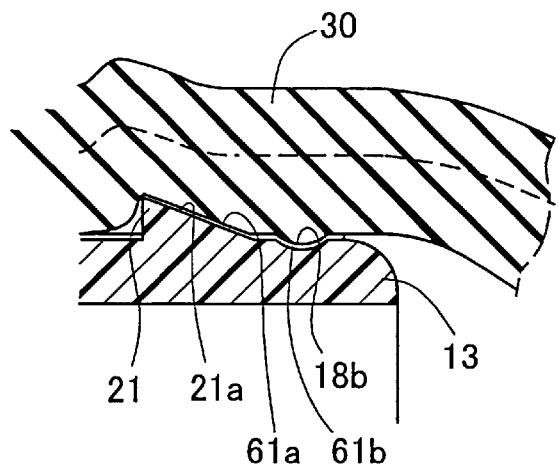
Figure 26:
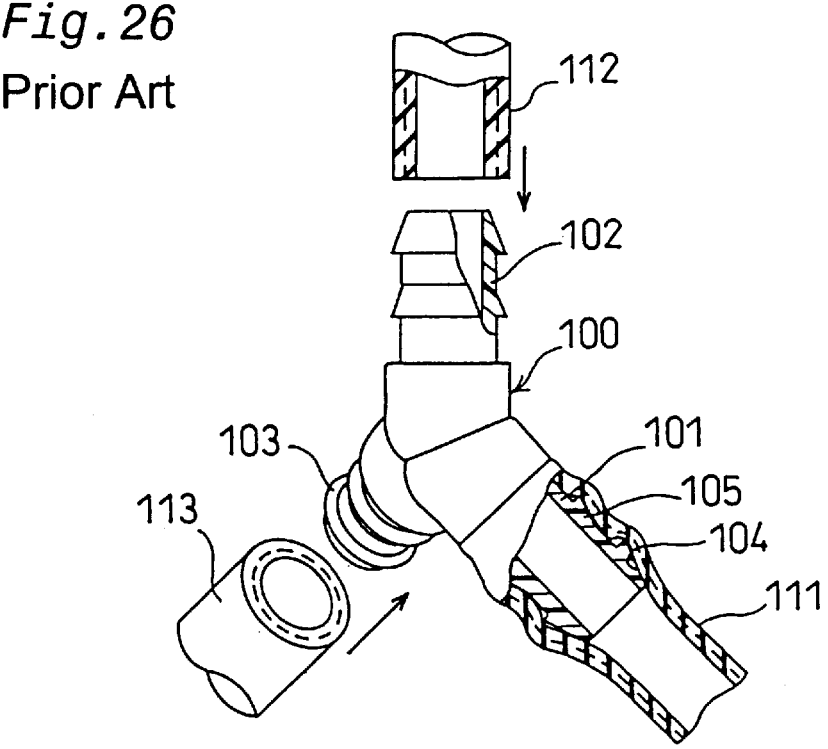
FIG. 26 is a partly broken front view illustrating a prior art branched pipe.
Figure 27:
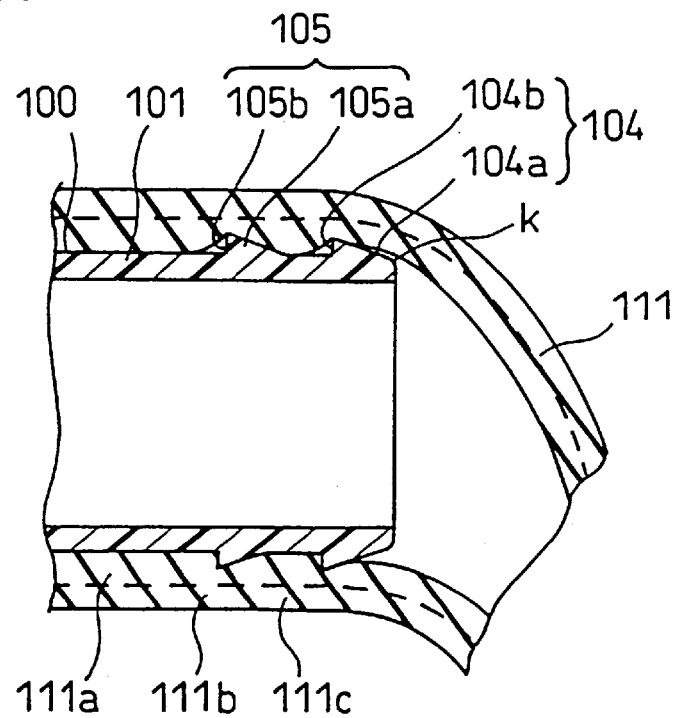
FIG. 27 shows a disadvantage of the prior art branched pipe.

FIGS. 25(A) through 25(C) are sectional views illustrating still another hose connecting assembly in still another embodiment according to the present invention. Referring to FIG. 25(A), concaves 18b, 18c, 18d, and 18e are formed in the outer circumferential surface of the hose connecting tube 13 at positions corresponding to the foots of the ring-shaped projections 21, 22, and 23. Prior to the insertion of the hose connecting tube 13 into the hose 30, an adhesive 61b may be applied on the concaves 18b through 18e. Alternatively the adhesive 61b may be applied to fill the concaves 18b through 18f in the course of the insertion of the hose connecting tube 13 into the hose 30. As shown in FIG. 25(B), the inner wall surface of the hose 30 is apart from the bottom of the concave 18b immediately after the insertion of the hose connecting tube 13 into the hose 30. As shown in FIG. 25(C), however, the inner wall surface of the hose 30 is deformed along the slope of the ring-shaped projection 21 to be close to the bottom of the concave 18b with an elapse of time. The adhesive 61b collected in the concave 18b accordingly comes into contact with the inner wall surface of the hose 30 and securely joins the inner wall surface of the hose 30 with the outer circumferential surface of the hose connecting tube 13. The adhesive 61b attains and maintains the sufficient adhesion corresponding to the deformation of the hose 30 after the insertion of the hose connecting tube 13 into the hose 30.

The present invention is not restricted to the above embodiments or their modifications, but there may be many other modifications, changes, and alterations without departing from the scope or spirit of the main characteristics of the present invention. Some examples of possible modification are given below.

In the above embodiments, the ring-shaped projections 21, 22, and 23 are defined by the truncated cone faces 21a, 22a, and 23a and the acute-angled faces 21b, 22b, and 23b. The ring-shaped projections 21, 22, and 23 are, however, not restricted to this arrangement so long as they expand the diameter of the hose 30 and ensure a sufficient seal. For example, the corners of the ring-shaped projections may be rounded to decrease the insertion force of the hose. The number of the ring-shaped projections may be set arbitrarily, by taking into account the pull-out resistance and the insertion force of the hose. Additionally, the plurality of ring-shaped projections may have different dimensions.

(2) The hose 30 in the above embodiments has the thread-reinforced layer, which is made of braided or spirally networked reinforcing threads. As long as the structure decreases the gaps between the hose and the hose connecting tube 13, the hose may have a cloth-reinforced layer or made of a single-layered rubber material or an elastomer.

The scope and spirit of the present invention are limited only by the terms of the appended claims.

What is claimed is:

1. A hose connecting assembly comprising a hose connecting tube and a hose, where the hose connecting tube is pressed into the hose to ensure connection with said hose, the hose having an inner diameter d1 when no pressure is applied, said hose connecting tube including:

a ring-shaped projection formed around an outer circumferential surface of said hose connecting tube, the ring-shaped projection having an outer diameter D1, which is greater than the inner diameter d1 of said hose, wherein said ring-shaped projection has a diameter expansion rate T of at least 25%, which is defined as (D1−d1)×100/d1, and wherein said hose connecting tube is pressed into said hose at a press fit factor Lh/Lp in a range of 1.05 to 1.4, where Lp denotes a length of said hose connecting tube and Lh denotes a length of said hose into which said hose connecting tube is pressed, the length Lh being measured when the hose connecting tube is not pressed into the hose.

2. A hose connecting assembly in accordance with claim 1, further comprising a hollow cylindrical end formed between said ring-shaped projection and a free end of said hose connecting tube, the hollow cylindrical end being arranged to be in close contact with an inner wall of said hose and have an outer diameter D2, which is smaller than the outer diameter D1, wherein said hollow cylindrical end has a length of at least about 3 mm along an axis of said hose connecting tube.

3. A hose connecting assembly in accordance with claim 2, wherein said ring-shaped projection has an acute edge that is pressed against the inner wall of said hose.

4. A hose connecting assembly in accordance with claim 3, wherein said hose connecting assembly further includes three ring-shaped projections formed around the outer circumferential surface of said hose connecting tube and arranged at regular intervals along the axis of said hose connecting tube.

5. A hose connecting assembly in accordance with claim 2, wherein said hollow cylindrical end has a length less than or equal to about 7 mm along the axis of said hose connecting tube.

6. A hose connecting assembly in accordance with claim 1, wherein said hose is designed to have an inner diameter change rate Dc less than or equal to 23%, which is defined as (d2−d1)×100/d1, wherein d2 denotes an inner diameter of the hose when an inner pressure of about 0.49 Mpa is applied.

7. A hose connecting assembly in accordance with claim 6, wherein said hose has a multi-layered structure including a rubber tube and reinforcing threads embedded in the rubber tube.

8. A hose connecting assembly in accordance with claim 1, further including an automobile engine, wherein said hose connecting tube is connected to the engine.

9. A hose connecting assembly in accordance with claim 1, wherein a ratio S1/S0 is set to be no greater than 0.95, where S0 denotes a cross sectional area of a gap Sp between an inner wall of said hose and said hose connecting tube when the press fit factor Lh/Lp is 1, and S1 denotes a cross sectional area of the gap Sp when said hose connection tube is pressed into said hose.

10. A hose connecting assembly in accordance with claim 9, wherein said ring-shaped projection has an acute edge that is pressed against the inner wall of said hose.

11. A hose connecting assembly in accordance with claim 1, wherein said ring-shaped projection has an edge and a curved face between the edge and the outer circumferential surface of said hose connecting tube so that the edge and the curved face are in contact with an inner wall of said hose.

12. A hose connecting assembly in accordance with claim 11, wherein said ring-shaped projection has an acute edge that is pressed against the inner wall of said hose.

13. A hose connecting assembly in accordance with claim 12, wherein said ring-shaped projection has a curved face, the curved face being formed with a fabricated filler material.

14. A hose connecting assembly in accordance with claim 13, wherein said filler material is made of a thermoplastic elastomer.

15. A hose connecting assembly in accordance with claim 1, further comprising a detent projection that is arranged close to said ring-shaped projection and has a different sectional shape from a sectional shape of said hose connecting tube to prevent said hose from being rotated relative to said hose connecting tube.

16. A hose connecting assembly in accordance with claim 15, wherein said ring-shaped projection has an acute edge that is pressed against the inner wall of said hose.

17. A hose connecting assembly in accordance with claim 16, wherein said ring-shaped projection is arranged between a free end of said hose connecting tube and said detent projection.

18. A hose connecting assembly in accordance with claim 1, wherein an adhesive is applied on at least one of the outer circumferential surface of said hose connecting tube and an inner circumferential surface of said hose, before said hose connecting tube is pressed into said hose, so that said hose connecting tube is fixed to said hose via the adhesive.

19. A hose connecting assembly in accordance with 18, wherein the adhesive is a thermosetting adhesive that sets at a temperature in a working environment of said hose connecting assembly.

20. A hose connecting assembly in accordance with claim 19, wherein the adhesive is an isocyanate adhesive.

21. A hose connecting assembly in accordance with claim 20, wherein the adhesive is used with an agent for insertion, which is applied on at least one of the outer circumferential surface of said hose connecting tube and the inner circumferential surface of said hose, before said hose connecting tube is pressed into said hose, so as to facilitate the insertion of said hose connecting tube into said hose.

22. A hose connecting assembly in accordance with claim 1, wherein an adhesive is applied on one of the outer circumferential surface of said hose connecting tube and an inner circumferential surface of said hose, and an agent, which facilitates the insertion of said hose connecting tube into said hose, is applied on the other of the outer circumferential surface of said hose connecting tube and the inner circumferential surface of said hose, before said hose connecting tube is pressed into said hose, so that said hose connecting tube is fixed to said hose via the adhesive.

* * * * *